United States Patent [19]

Grumet

[11] 4,156,558
[45] May 29, 1979

[54] INCOHERENT TO COHERENT TRANSDUCER AND METHOD OF MANUFACTURE

[75] Inventor: Alex Grumet, Whitestone, N.Y.

[73] Assignee: Grumman Aerospace Corporation, Bethpage, N.Y.

[21] Appl. No.: 821,766

[22] Filed: Aug. 4, 1977

[51] Int. Cl.² .............................. G02F 1/13
[52] U.S. Cl. .................... 350/320; 350/340; 350/341; 350/342; 338/15; 96/1.5 R; 252/501; 427/74; 427/85; 427/86; 427/107; 427/255; 427/205; 423/561 B
[58] Field of Search .............. 350/320, 340, 341, 342; 357/30, 63; 338/15; 96/1.5; 252/501; 427/74, 85, 86, 107, 299, 255, 205; 423/561 B

[56] References Cited
U.S. PATENT DOCUMENTS

| 3,391,021 | 7/1968 | Esbitt et al. ............ 252/951 X |
| 3,732,429 | 5/1973 | Braunstein et al. ............ 350/342 X |
| 3,824,002 | 7/1974 | Beard ............................ 350/342 |
| 3,980,403 | 9/1976 | Pollack ........................ 350/348 X |
| 4,060,316 | 11/1977 | Pollack ........................ 350/342 X |

OTHER PUBLICATIONS

Kahn et al., "Surface-Produced Alignment of Liquid Crystals," *Proc. IEEE*, vol. 61, pp. 823-828, Jul. 1973.

*Primary Examiner*—Edward S. Bauer
*Attorney, Agent, or Firm*—Richard G. Geib; Mellor A. Gill

[57] ABSTRACT

A liquid crystal device comprising a liquid crystal layer intermediate a substrate coated by a surfactant and another substrate coated by a photoconductive and a surfactant thereover that is manufactured by taking cleaned electrically conductive transparent substrates and depositing a photoconductor such as cadmium sulfide to one with thereafter treating that one so as to coat it with a surfactant and at the same time coat the other substrate with a surfactant before joining the substrates with a liquid crystal therebetween whose molecules are oriented by the said surfactant.

2 Claims, 3 Drawing Figures

INCOHERENT TO COHERENT TRANSDUCER AND METHOD OF MANUFACTURE

BACKGROUND OF THE INVENTION

Prior art U.S. Pat. No. 3,446,963 is illustrative of the teaching within the prior art that one may utilize compounds such as cadmium sulfide to take advantage of the photoconduction phenomenon of the device and the quenching phenomenon of cadmium sulfide.

Prior art U.S. Pat. No. 3,854,793 is also illustrative of the fact one may use a silane coupling material to produce a liquid crystal device in which the liquid crystal molecules are ordered in a specific manner.

The prior art, as illustrated by the aforesaid, is void of any suggestion that a combination of the cadmium sulfide treated substrate and a surfactant enclosed liquid crystal would be an improvement.

It is because of the advantages that have been found by such a combination that the following disclosure to those skilled in the art is deemed to be of beneficial interest.

DRAWING DESCRIPTION

DETAILED DESCRIPTION

Figure 1:
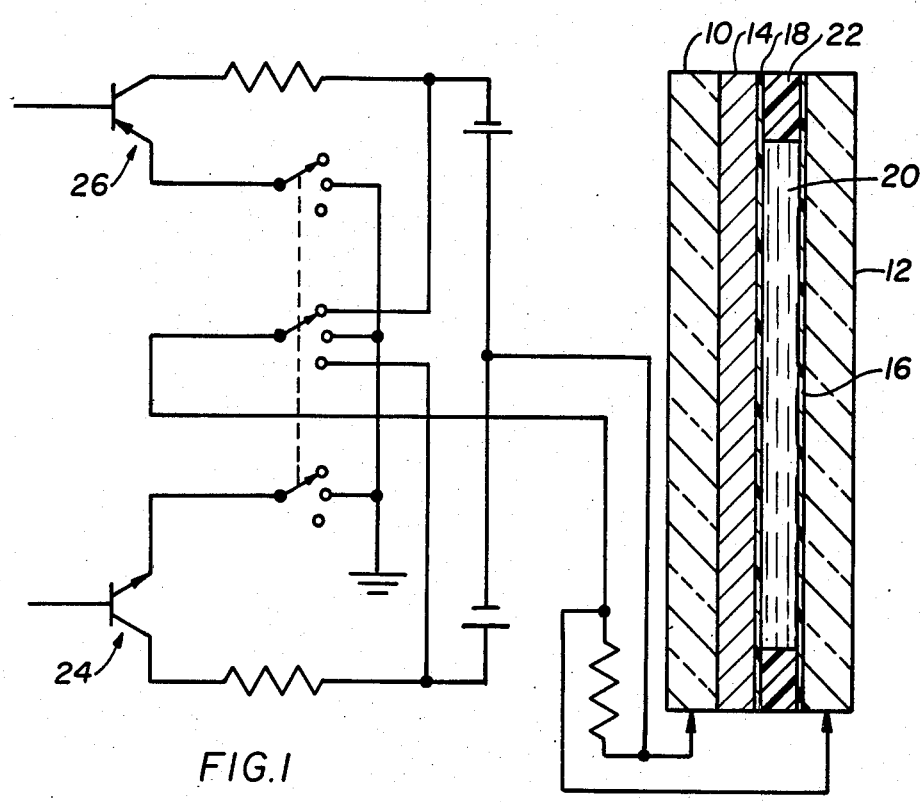
FIG. 1 is a cross sectional view of a transducer in accordance with the principles of this invention having schematically connected thereto a driving circuit for the operation thereof.

With more particular reference to FIG. 1 there is shown a pair of glass substrates 10 and 12. On the transparent conductive face of substrate 10 there has been deposited a cadmium sulfide layer 14. Over this and the other substrate 12 on its transparent conductive face alkasilane surfactant layers 16 and 18 have been deposited. Liquid crystal layer 20 is sandwiched between the surfactants 16 and 18 to the depth limited by a peripheral spacer 22.

Completing the description of FIG. 1 there is shown a complimentary driver circuit using complimentary transistors 24 and 26 with an appropriate circuitry that will permit the operation of the liquid crystal device aforesaid upon the application of a pulse of alternate polarity. The circuit for providing the pulse to the complimentary drivers is believed to be within the ability of one skilled in the art. The main requirement for such a circuit is that the positive and negative pulse amplitude and duration should be independently adjustable and the circuit should be such that pulse response speeds can be measured.

Figure 2:
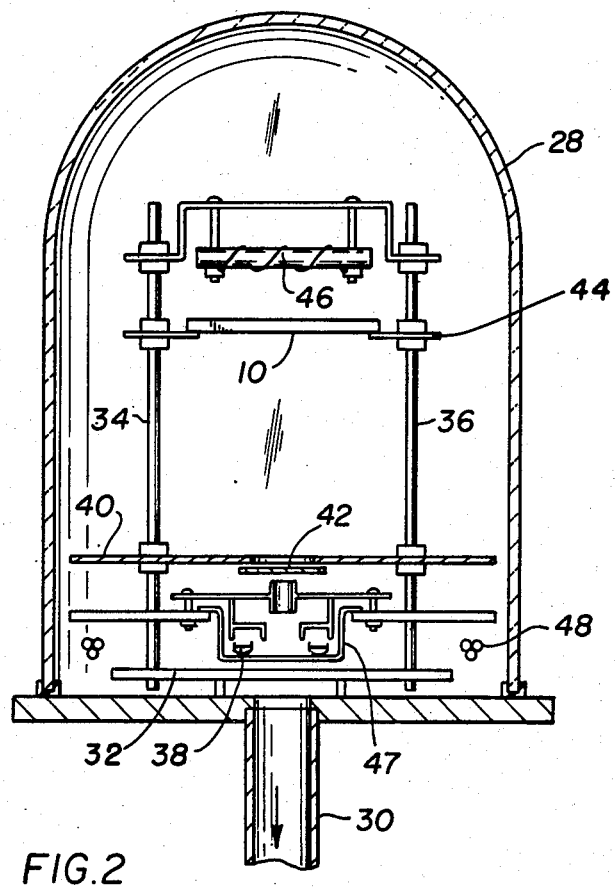
FIG. 2 is a schematic illustration of a means that may be utilized in the fabrication of elements of the transducer of FIG. 1.

Turning next to FIG. 2 there is shown a bell jar 28 within which a vacuum may be drawn via the outlet provision 30. The bell jar rests in an appropriate trough on a support 32 that also provides support for rods 34 and 36. A cadmium sulfide crucible 38 is supported via these rods under a stainless steel baffle 40 having a shutter 42 for the control of cadmium sulfide introduction within the bell jar under a substrate support plate 44. As seen a substrate 10 is supported on the annular plate 44 so as to have an area exposed to the shutter 42. Above the substrate a hot plate 46 is located so as to provide a source of radiant heating for the substrate as will be described hereinafter. Completing this vacuum assembly station is a three turn cooling coil 48, typically liquid nitrogen cooled.

It is preferred that the fabrication start with atomically clean transparent indium oxide coated glass. This is not to be limited to such as the transparent conductive electrode as other types may be equally appropriate in this invention. It is imperative, however, that the substrate be very clean before the film deposition step. Any microscopic contaminant on the surface tends to nucleate from formation more rapidly in that area, and a non-uniform film deposition may result. Therefore, it is suggested that a cleaning procedure to insure an atomically clean transparent conductive substrate will be one which consists of a five-minute boil in Fischer's Sparkleen, followed by a five-minute boil in deionized water, and thereafter with a five-minute boil in hydrogen peroxide followed finally by a five-minute boil in deionized water. After cleaning the slides are preferably stored in deionized water and prior to the insertion in the bell jar 28 they are blown dry with filtered air.

After the insertion of a clean substrate on the carrier 44 within the jar 28 the baffled furnace 47 is activated such that the cadmium sulfide in the crucible 38 is vacuum deposited on the exposed surface of the substrate 10. Actually the vacuum depositions sequence of operation consists of an operation of the hotplate 46 to preheat the substrate for approximately 40 minutes and thereafter a 10 minute furnace preheat before shutter 42 is opened for a 30-minute deposition interval. Preferably the cadmium sulfide deposition is at the rate of 2 microns per hour. This rate is strongly influenced by the temperature of the substrate. Darker, browner cadmium sulfide layers are produced on cold substrates, as indicated by mineral vapor pressure in the cadmium-rich region. For a more stoichiometric layer of cadmium sulfide, the substrate, as aforesaid, is radiantly heated by the hotplate 46. However, temperatures above 200° C. will result in evaporation of the cadmium sulfide film from the substrate and the operating temperature of 180° C. has been found to be too low to yield the desired stoichiometry.

Figure 3:
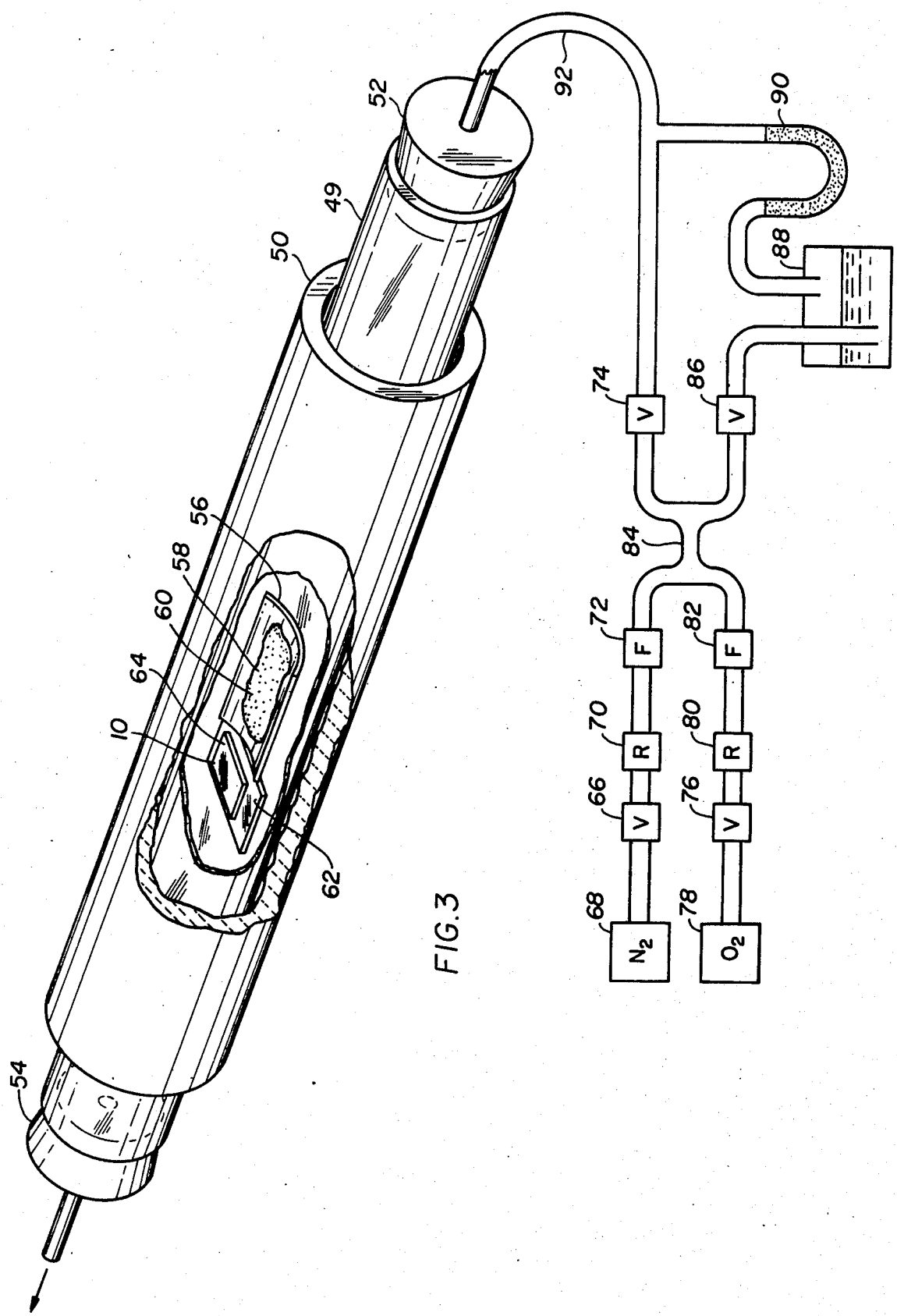
FIG. 3 is another schematic illustration of a refining process step to be employed in the manufacture of the transducer of FIG. 1.

Additional post-processing at high temperatures has been found to yield improved crystalline growth and permits the application of dopants to be added to the cadmium sulfide film that will enhance photoconductivity and impedance thereof. More particularly, the amorphous cadmium sulfide film is made photoconductive by utilizing a process involving the quartz tube 49 of FIG. 3. This quartz tube 49 is placed within an annular oven 50 and is provided with end plugs 52 and 54 to provide a fluid flow into and out of the quartz tube within the oven. Within the tube 49 a crucible 56 is provided within which a cadmium sulfide powder 58 is deposited with a dusting of 5 grams of 320 mesh copper powder 60 thereover. A quartz plate 62 is supported by the sidewalls of the tube 49 so that the cadmium sulfide surface 64 of the substrate 10 is exposed and will lay flat on the quartz support.

The first step in the processing is to operate valve 66 so as to open nitrogen supply reservoir 68 to the regulator 70 wherefrom it is passed to a flow meter 72 and upon opening of valve 74 allowed to purge the jar 48 at a controlled flow rate of 3,500 cubic centimeters per minute for 15 minutes. Thereafter, and prior to firing, a valve 76 is opened so as to connect oxygen reservoir 78 to a regulator 80 and via a flow meter 82 to a common outlet 84 with the flow of the nitrogen from the flow meter 72. Valves 66 and 76 are adjusted for a typical flow rate of 2.5 cubic centimeters per minute and to provide the desired combination of oxygen, nitrogen gas for the tube 48. Valve 86 is then controlled so as to bleed off approximately 7% of the oxygen nitrogen mixture through a reservoir 88 containing a 37% hydrogen chloride solution. This will bubble through a hydrogen chloride solution to pick-up and carry chlorine gas into conduit 90 and then conduit 92 leading to the jar 48. It may be best realized that the flow of gas will pick up heat so that approximately 8 inches to either side of the center of the furnace the temperature will be approximately 500° C. This will permit the doping of the cadmium sulfide surface 64 with a copper and cadmium sulfide vapor diffusion process to increase the sensitivity of the photoconductive layer formed thereby. Furthermore the bubbling of a 7% nitrogen oxygen mixture through the 37% hydrogen chloride solution will provide a chlorine dopant that will enhance the impedance of the photoconductive layer of cadmium sulfide. It has been found that a gaseous chlorine supply would not provide a lasting coating for the CdS layer. After the vapor deposition process aforesaid, the doped substrate is baked at approximately 60° C. for 20 minutes. This provided a consistency in obtaining light-to-dark photoconductivity ratios of $10^7$.

Next an alkoxysilane surfactant is coated on the cadmium sulfide surface 64 preferably by a brushing application where a soft camel hair brush is dipped in a solution of n, n-dimethyl-n-octadecyl-3-aminopropyltrimethoxysilyl chloride (DMOP) or n-methyl-3-aminopropyltrimethoxysilane (MAP) to obtain a monoplayer on the cadmium sulfide surface 64 that could be polymerized and which would encourage selected alignment of liquid crystal molecules homotropically or homogeneously, respectively.

Similarly, and perhaps simultaneously, the uncoated transparent electrodes substrate 12 is coated with the same surfactant. Thereafter these coated elements are rinsed in deionized water and dried in a filtered air and baked at 60° for approximately one-half hour.

While these surfaces are still hot from the baking a liquid crystal droplet will be deposited onto the surfactant layer 18 over the surface of cadmium sulfide layer 14 and the other surfactant coated substrate 12 is pressed thereon to spread the liquid crystal to a film layer 20 of a thickness determined by teflon or other good dielectric spacers 22 that have been inserted as a peripheral ring about the device prior to the pressing of the substrates together.

It should be noted that alternately the surfactants may be typically applied from a 0.5% water solution by volume with agitation having a duration of approximately 5 minutes. The excess silane is removed by a rinsing with deionized water so that a monoplayer of the silane coating will remain. Excess water may be blown free with filtered air, and, if required, the silane (surfactant) film is cured in dry nitrogen atmosphere at 110° C. for 1 hour prior to the baking step, aforesaid.

A typical liquid crystal for use in the transducer of this invention is a 50/50 mixture of N-(P-methoxy-benzylidene)-butylaniline, (MBBA) $CH_bO$—$C_6H_6$—CH=N—$C_6h_6$—$(CH_2)_3CH_3$ and N-(p-Ethoxybenzylidene)butylaniline, (EBBA), $C_2H_5O$—$C_6H_6$—CH=N—$C_6H_6$—$(CH_2)_3CH_3$ with a few percent of Ethoxytriglycol.

Applying the liquid crystal to the hot surfactant surfaces will create a temperature gradient across the droplets of liquid crystal whereby the molecules adjacent the heated surface will be in random order. Those intermediate the heated surfaces will be aligned, in one form or another. As the surfactant and substrates cool to room temperature the random oriented chains of molecules will align perpendicular or parallel to the surface, depending upon the type of surfactant, and upon aligning, these molecules will react against those of the intermediate layer to force them to be aligned with the surface molecules such that all the molecules will be aligned as controlled by the surfactant surfaces. After assembly the transducer is exposed to a temperature of 60° C. for 30 minutes.

The foregoing being a complete description of an incoherent to coherent transducer and the process of fabricating same, it is now desired to set forth the protection sought by these Letters Patent by the appended claims as follows:

I claim:

1. A method of fabricating a real time transducer: preparing conductive surfaces and thereafter cleaning such transparent electrode substrates by exposing same to a 5 minute boil in a cleaner, a 5 minute boil in deionized water, a 5 minute boil in hydrogen peroxide and lastly a 5 minute boil in deionized water with a rinse intermediate each step aforesaid in deionized water;
storing said cleaned substrates in deionized water;
blow drying said substrates with filtered air;
vacuum deposition of cadmium sulfide at a rate substantially equal to two microns per hour by preheating one of said substrates by radiantly heating with a hotplate for 40 minutes and applying furnace heat for 10 minutes to bring the substrate to between 180° C. to 200° C. for desired stoichiometry of the cadmium sulfide film, said deposition being allowed to continue for approximately 30 minutes;
post processing said cadmium sulfide film covered substrate by placing same in a quartz tube adjacent a composition of 80 grams of electronic grade cadmium sulfide dusted with 5 grams of 320 mesh copper powder, purging said tube with 3500 cc/minute of nitrogen gas for 15 minutes, flowing through the tube interior thereafter oxygen gas at 2.5 cc/min, bleeding a 7% oxygen-nitrogen mixture through a 37% hydrogen chloride solution and introducing same to the tube, and heating the interior of the tube such that flow across the composition and thence the film will be at approximately 500° C. from 8 inches to either side of the center of the tube where the film and composition are situated;
applying a monolayer of surfactant to said cadmium sulfide and said untreated substrate of an alkoxysilane of a molecular bonding group that will react chemically with the film on the substrate to form a chemically stable bond, by applying said surfactant in a 0.5% water solution by volume with agitation of the substrate at room temperature for approximately 5 minutes and then rinsing in deionized water to remove excess silane;
depositing a few drops of a liquid crystal on the surfactant over the cadmium sulfide;
encircling an area of liquid crystal with dielectric spacers; and
applying the substrate coated with surfactant only over the liquid crystal deposited over the cadmium sulfide to spread the liquid crystal out to a thickness determined by the spacers.

2. The method of claim 1 wherein the liquid crystal is deposited and spread after heating it above its upper transition temperature to the isotropic state and slowly thereafter cooling it to the mesomorphic phase.

* * * * *